3,781,250
PROCESS FOR THE VULCANIZATION OF HOMO-
OR COPOLYMERS OF CONJUGATED DIENES
Jurgen Wolpers, Haltern, Germany, assignor to Chemi-
  sche Werke Huls Aktiengesellschaft, Marl, Germany
No Drawing. Filed Feb. 22, 1971, Ser. No. 117,757
Claims priority, application Germany, Feb. 24, 1970,
               P 20 08 479.1
    Int. Cl. C08c 11/54; C08d 9/00; C08f 27/06
U.S. Cl. 260—79.5 B                           8 Claims

ABSTRACT OF THE DISCLOSURE

Vulcanizates of homo- and copolymers of conjugated dienes with improved heat-aging characteristics are produced employing a vulcanization system which comprises an organic dithiol, e.g., dodecane-1,12-dithiol, a vulcanization accelerator, and sulfur.

BACKGROUND OF THE INVENTION

This invention relates to a process for the vulcanization of homo- or copolymers of conjugated dienes and to the vulcanizates thus-produced.

As is known, conventional vulcanizates all exhibit poor heat-aging characteristics. This disadvantageous characteristic manifests itself in case of polybutadiene in a hardening of and increased brittleness of the vulcanizate and, in case of polyisoprene, in a softening of the vulcanizate. Moreover, and especially with polyisoprene, optimum mechanical properties can be attained only in a relatively narrow range of the vulcanization period. Outside this narrow range, physical values, such as, for example, stress value (modulus), tensile strength, resistance to crack growth during prolonged heating times, are lowered again. This phenomenon, known as reversion of the rubber, as well as the above-mentioned poor heat-aging characteristic, represent the most significant disadvantages of the conventional vulcanizates.

Attempts have been made to overcome these disadvantages by employing, instead of the customary dosages of sulfur and accelerator as the vulcanizing system, only minor amounts of sulfur and high amounts of accelerator. Also, so-called "sulfur-donors" such as, for example, thiuram disulfides, and organic hydroperoxides, have been utilized as vulcanizing agents. Although it is possible to suppress the reversion phenomena by such methods, the thus-obtained vulcanizates all exhibit, as a disadvantage, poorer physical properties, such as, for example, lower tear resistance and elongation at rupture in case of polyisoprene.

Finally, attempts have been made to employ organic dithiols as vulcanizing agents. Although rubber solutions treated in this way yielded tack-free films, there was a serious disadvantage to their use in that the dithiols react very quickly. See U.S. Pat. No. 2,411,954.) This important determination was also confirmed by Hull and co-workers, Ind. Engng. Chem. 40, 513 (1948), who found that rubber mixtures begin to vulcanize within a few minutes after the addition of a dithiol compound at room temperature on a rolling mill. In view of these considerations, the customary processing of rubber-dithiol mixtures, for example on a rolling mill or in a masticator, for all practical purposes was inherently impossible.

On the other hand, it was found that a vulcanizing effect could be achieved with a specific dithiol, viz, 4,4'-dimercaptodiphenyl ether, without premature vulcanization of the vulcanization mixture. However, it was also found that vulcanization occurred very gradually when the vulcanizing system consisted solely of a dithiol and sulfur. This gradual vulcanization manifests itself in that the modulus of the vulcanizate continues to increase considerably during heating periods of up to 60 minutes at 177° C. This effect, known as "marching modulus," is an undesired phenomenon since the rubber processor, in spite of a strictly adhered-to recipe, cannot achieve a definite predetermined modulus, the magnitude of which also affects the hardness of the finished article.

It is therefore an object of this invention to avoid the above-mentioned disadvantages in a simple and economical manner. Other objects will be apparent to those skilled in the art to which this invention pertains.

SUMMARY OF THE INVENTION

According to this invention, homo- and/or copolymers of conjugated dienes can be vulcanized with sulfur and a vulcanization accelerator without the above-described disadvantages, by conducting the vulcanization in a conventional manner employing a vulcanization system consisting essentially of:

(a) an organic dithiol;
(b) a conventional vulcanization accelerator; and
(c) sulfur.

Any organic dithiol whose thiol groups are functionally reactive can be employed. Preferably, the dithiol is free of other reactive functional groups, e.g., acid and amino groups. Also, in order to ensure compatability and reactivity with the rubber, the molecular weight of the dithiol is preferably less than 350, more preferably less than 250.

DETAILED DISCUSSION

The vulcanization system preferably consists essentially of
(a) about 0.5–12 parts by weight, preferably about 1.4–6 parts by weight, of the organic dithiol;
(b) about 1–6 parts by weight, preferably about 1.5–3 parts by weight, of the vulcanization accelerator; and
(c) about 0.1–1.5 parts by weight, preferably about 0.2–1 part by weight, of sulfur; based on 100 parts by weight of rubber.

In a preferred embodiment of this invention, the organic dithiol employed has the formula HS—R—SH, wherein R is a difunctional straight-chain or branched alkylene group containing 2–18 carbon atoms in the longitudinal axis, a cycloaliphatic group containing 5 and 6 carbon atoms in the ring, and, optionally, one or more alk-oxa groups or alk-oxa-thia groups. Of these, especially preferred are those wherein R is straight-chain alkylene containing 2–18 carbon atoms, particularly those containing 10–12 carbon atoms, branched alkylene containing 2–18 carbon atoms in the longest carbon chain, or cycloalkylene containing 5 and 6 carbon atoms in the ring. Specific examples of such compounds are

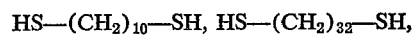

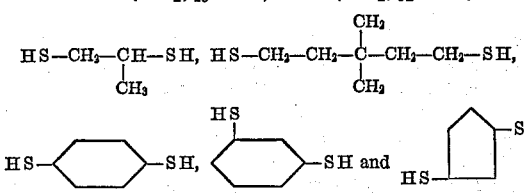

In a further preferred embodiment of this invention, the organic dithiol has the formula HS—R—SH, wherein R represents an alkylene group containing one or more oxa or oxa-thia in the chain, forming alkylene-oxa and/or alkylene-oxa-thia groups, preferably wherein alkylene is methylene and/or ethylene, which can be repeated within the molecule. Of these, preferred are compounds of the formula

$n$ being an integer, e.g., from 1–10. Especially preferred is the compound of the formula $$H(-S-CH_2CH_2-OCH_2O-CH_2CH_2-S-)_6H.$$

This dithiol is commercially available under the trade name "Thiokol" LP 3. These compounds are preferably employed in amounts of 2–12 parts by weight, more preferably 4–6 parts by weight, based on 100 parts by weight of rubber.

Other examples of organic dithiols which can be employed are arylenedithiols, e.g., m-benzenedithiol, p-tolylenedithiol, p,p'-biphenyldithiol, bis-thiophenol-A, other alkanedithiols, e.g., ethanedithiol, 1,3-propanedithiol, 1,8-octanedithiol, 1,6-octanedithiol, 1,6-hexanedithiol, bis-(2-mercaptoethyl)sulfide, etc.

Any conventional vulcanization accelerator can be employed. Examples of suitable vulcanization accelerators are compounds of the thiazole type, such as, for example, mercaptobenzothiazole and dibenzothiazolyl disulfide, and amine accelerators, alone or in combination with dibenzothiazolyl disulfide. Sulfenamides are particularly suitable, especially N-cyclohexylbenzothiazyl sulfenamide [N - cyclohexyl - 2-benzothiazolesulfenamide]. The amount of vulcanization accelerator usually can vary from about 1 to 6 parts by weight, based on 100 parts by weight of rubber. In general, about 1.5–3 parts by weight is preferred.

In addition to the dithiol compound and vulcanization accelerator, small amounts of sulfur are required for the vulcanization of this invention. Without sulfur, the mixtures would vulcanize only very slowly, if at all. In general, amounts of about 0.1–1.5 parts by weight of sulfur are sufficient, with 0.2–1.0 part by weight being especially advantageous.

Any unvulcanized homopolymer or copolymer conjugated diene rubber which can be vulcanized with sulfur or a sulfur accelerator vulcanization system can be employed in the process of this invention. Suitable homopolymers of conjugated dienes are polybutadienes, especially stereoregular polybutadienes, e.g., with cis-1,4-contents of 30–98%, and polyisoprenes, preferably stereoregular polyisoprenes, e.g., with cis-1,4-contents of more than 90%.

Preferred copolymers of conjugated dienes are those with vinyl-aromatic compounds, especially styrene copolymers, e.g., styrene-butadiene copolymers (SBR), and with acrylonitrile copolymers, e.g., acrylonitrile-butadiene copolymers (NBR).

The homo- and/or copolymers to be vulcanized in accordance with this invention can be processed as such, or as a mixture with the customary fillers and adjuvants. In this connection, suitable fillers are all types of carbon blacks, oils, as well as the conventional rubber adjuvants, e.g., stearic acid and zinc oxide, mold release agents and auxiliary processing agents.

A typical filled mixture consists, for example, of 100 parts by weight of rubber, 50 parts by weight of HAF [high abrasion furnace] carbon black, 8 parts by weight of oil, 3 parts by weight of zinc oxide, 2 parts by weight of stearic acid, and 1 part by weight of phenyl-$\beta$-naphthylamine. A typical unfilled mixture has an analogous composition, except for the absence of carbon black and oil. In place of carbon black, it is also possible to employ other fillers, e.g., clay, silica gel or chalk.

The mixtures to be processed in accordance with this invention do not prematurely vulcanize during processing and generally vulcanize rapidly to the desired degree during processing.

The vulcanizing rates obtainable with the process of this invention, for all practical purposes, do not vary from the vulcanization rates obtained with conventional vulcanization systems. Other vulcanization conditions likewise do not differ from those otherwise conventionally employed. Thus, the vulcanization conducted within the scope of the process of the present invention is usually carried out at the customary temperatures of between 140 and 160° C. Since the vulcanization takes place without reversion and results in vulcanizates with an excellent level of total properties, it is possible to employ even higher vulcanizing temperatures in the range between 160 and 200° C. without disadvantages. Thus, the process of this invention can be conducted at temperatures of about 140–200° C., preferably about 150–170° C.

The vulcanizates obtained, in particular, from polybutadiene and polyisoprene, in accordance with the process of this invention are distinguished by a complete freedom from reversion, even at high temperatures. They also possess excellent heat-aging properties. These properties of the vulcanizates, which are unexpectedly good, stem exclusively from the specific combination in the vulcanizing system, as can clearly be seen from the examples which follow. If any one of the components of the vulcanization system is omitted, the improved properties of the vulcanizates obtained by the process of this invention are not attained.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

In an internal mixer, a basic mixture is produced having the following composition:

100 parts by weight of a polybutadiene rubber produced in the presence of cobalt compounds with a cis-1,4-content of 97% ("Buna" CB 10—commercial product of Stereokautschuk-Werke G.m.b.H. & Co. KG);

50 parts by weight of HAF black;

8 parts by weight of an oil having a high content of aromatics ("Naftolen" MV);

3 parts by weight of zinc oxide;

2 parts by weight of stearic acid; and 1 part by weight of phenyl-$\beta$-naphthylamine.

This basic mixture is mixed on a mill with a vulcanization system consisting of 3 parts by weight of N-cyclohexylbenzothiazyl-sulfenamide (CBS), 2.9 parts by weight of dodecane-1,12-dithiol, and 0.4 part by weight of sulfur (S), based on 100 parts by weight of the rubber.

Samples of the finished mixture are vulcanized with heating times of 30 and 60 minutes, respectively, at 150° C. The properties of the resulting vulcanizates are set forth as Examples 1(a) and 1(b) in Table 1 of the tables following the examples. In this table and in Tables 2, 3 and 4 which follow, the abbreviations mean the following:

Ten.—tensile strength in kp./cm.$^2$;
Elong.—elongation at rupture in percent;
$M_{300}$—modulus at 300% elongation, likewise in kp./cm.$^2$;
SH—Shore hardness;
Tear—tear resistance;
El.—elasticity at 22° C. and 75° C.

In the column for the heat aged samples, the percentage value based on the tensile strength and elongation of the non-aged sample, is set forth in each case after the values for the tensile strength and the elongation at rupture.

The thus-obtained vulcanizates of Examples 1(a) and 1(b) of Table 1 excel by their above-average tensile strength values of 170 and 166 kp./cm.$^2$, respectively, as compared to only 142–145 kp./cm.$^2$ of a comparative mixture of Examples 1(c) and 1(d) of Table 1, which were prepared without a diethiol in the vulcanization system.

The advantageous influence of the dithiol compound can also be seen from the excellent aging properties of the vulcanizates of Examples 1(a) and 1(b). The values for the samples aged 7 days at 100° C. still represent 93 and 98%, respectively, of their original tensile strength values and 85 and 95%, respectively, of their original elongation values.

With the aid of curemetry the vulcanization time which is required to achieve a vulcanization which is 90% complete (the so-called $t_{90}$-value) is determined. The $t_{90}$-value of the vulcanization mixture of Example 1 is 9.8 minutes, from which can be seen the high vulcanization rate achieved with the process of this invention.

In a further comparative test (Examples 1(e) and 1(f) of Table 1), the necessity of sulfur in the vulcanization system is demonstrated. For this purpose, the basic mixture is vulcanized only with 2.9 parts by weight of dodecanedithiol and 6.6 parts by weight of N-cyclohexylbenzothiazyl sulfenamide, the sulfur being omitted. In spite of more than double the dosage of accelerator, the mixture is hardly vulcanized, even after 60 minutes at 150° C., as can be seen from the poor property spectrum, especially the low modulus, of the resultant product.

Example 2

A vulcanization system consisting of 3 parts by weight of N-cyclohexylbenzothiazyl sulfenamide, 0.4 part by weight of sulfur and 4.3 parts by weight of dodecanedithiol is admixed with 164 parts by weight of the basic polybutadiene mixture (containing 100 parts by weight of rubber) described in Example 1. The vulcanization is conducted for 10 and 20 minutes at 150° C. Again, above-average tensile strength values and excellent aging properties are obtained. The high vulcanizing rate can clearly be seen from the brief heating times (10 and 20 minutes), which result in almost constant modulus values (Example 2(a) and 2(b) of Table 1).

Example 3

A vulcanization system consisting of 3 parts by weight of N-cyclohexylbenzothiazyl sulfenamide, 0.4 part by weight of sulfur and 0.7 part by weight of dodecandithiol is admixed with 164 parts by weight of the basic polybutadiene mixture described in Example 1. With vulcanizing times of 30 and 60 minutes, respectively, at 150° C., the resultant vulcanizates likewise exhibit high ultimate tensile strength values of 167 (Example 3(a), Table 1) and 159 kp./cm.$^2$ (Example 3(b), Table 1), respectively, and a modulus of 110 which is constant in both heating stages.

Example 4

A vulcanization system consisting of 3 parts by weight of N-cyclohexylbenzothiazyl sulfenamide, 0.3 part by weight of sulfur and 2.2 parts by weight of dodecanedithiol is admixed with 164 parts by weight of the basic polybutadiene mixture described in Example 1. Vulcanization analogously to Example 3 results in vulcanizates having excellent mechanical and aging properties.

Example 5

A vulcanization system consisting of 2.4 parts by weight of dodecanedithiol, only 2 parts by weight of N-cyclohexylbenzothiazyl sulfenamide and 0.5 part by weight of sulfur is admixed with 164 parts by weight of a basic polybutadiene mixture of a composition as set forth in Example 1. Vulcanization analogously to Example 3 results in vulcanizates again exhibiting excellent mechanical and aging properties.

Example 6

This exmaple demonstrates that the vulcanization of this invention can also be conducted at high temperatures, without any disadvantage.

A vulcanization system conssting of 3 parts by weight of N-cyclohexylbenzothiazyl sulfenamide, 0.4 part by weight of sulfur and 2.2 parts by weight of dodecanedithiol is admixed with 164 parts by weight of the basic polybutadiene mixture composed as described in Example 1. The test bodies produced from this mixture are vulcanized for 3, 5, and 10 minutes, respectively, at 180° C.

As can be seen from the values of Table 2, vulcanizates are obtained having good mechanical properties. Especially from the modulus, which rises with the vulcanizing time, it can be seen that the vulcanization takes place completely without reversion.

Example 7

This example, like Example 6, demonstrates that the vulcanization of this invention can also be conducted at high temperatures without any disadvantage. All other conditions of Example 6 being the same, the vulcanization is conducted at 200° C. The thus-obtained test bodies are heated for 3, 5, and 10 minutes, respectively. In spite of the high vulcanization temperature, vulcanizates are still obtained having good mechanical properties. Again, the modulus increases over the entire vulcanization period, from which the complete absence of reversion can be seen, even at 200° C. (see Table 2).

Example 8

In an internal mixer, a basic mixture is prepared having the following composition:

100 parts by weight of a polyisoprene produced in the presence of titanium and aluminum compounds, having a cis-1,4-content of 96% ("Ameripol" SN 600);
50 parts by weight of HAF black;
8 parts by weight of an oil having a high content of aromatics ("Naftolen" MV);
3 parts by weight of zinc oxide;
2 parts by weight of stearic acid; and
1 part by weight of phenyl-$\beta$-naphthaylamine.

164 parts by weight of this basic mixture are mixed with 3 parts by weight of N-cyclohexylbenzothiazyl sulfenamide, 0.4 part by weight of sulfur and 2.2 parts by weight of dodecanedithiol. Samples of the mixture are vulcanized at 150° C. for 20, 30 and 60 minutes, respectively. The thus-obtained vulcanizates exhibit, at a normal tensile strength level, absolute freedom from reversion and tear resistance values which further increase over the entire vulcanization period. The mechanical properties of the aged samples are excellent.

For comparison purposes, the same basic mixture is mixed with a vulcanization system which contains no dithiol, the composition otherwise being the same, and then vulcanized. The properties of this mixture are likewise compiled in Table 3. It can be seen therefrom that, in the non-aged test bodies, the tear resistance decreases more quickly with increasing vulcanization time than in the presence of dithiol. Especially the aging values obtained in accordance with the invention for tensile strength, tear resistance, and elasticity (Examples 8(a) to 8(c) of Table 2) differ markedly from a comparison test (Examples 8(d) to 8(f) of Table 3) without the addition of dodecanedithiol.

Example 9

A vulcanization system consisting of 3 parts by weight of N-cyclohexylbenzothiazyl sulfenamide, 0.5 part by weight of sulfur and 2.9 parts by weight of dodecane-1,12-dithiol is admixed with 164 parts by weight of a basic polyisoprene mixture having the composition set forth in Example 8, and the mixture is vulcanized. Again, the values for tear resistance of the non-aged samples, as well as tensile strength, tear resistance, and elasticity values of the aged test bodies are clearly superior to the values obtained from the mixture without dithiol (see Table 3).

Examples 8 and 9 show that the vulcanization system of this invention also yields the same excellent results when employed in the vulcanization of polyisoprene.

Example 10

A vulcanization system consisting of 4.1 parts by weight of "Thiokol" LP 3, 3 parts by weight of N-cyclohexylbenzothiazyl sulfenamide and 0.4 part by weight of sulfur is admixed with 164 parts by weight of the basic polybutadiene mixture described in Example 1, and the mixture is vulcanized. The thus-obtained test bodies are heated for 20, 30 and 60 minutes. The results are compiled in Table 4. The resulting vulcanizates are distinguished from vulcanizates obtained without dithiol (see Examples 1(c) and 1(d) of Table 1) especially by above-average tensile strengths of the no-aged test bodies and by excellent mechanical properties after aging.

Example 11

A vulcanization system consisting of 2 parts by weight of N-cyclohexylbenzothiazyl sulfenamide, 0.6 part by weight of sulfur and 4 parts by weight of "Thiokol" LP 3 is admixed with 164 parts of a basic polybutadiene mixture composed as described in Example 1, and vulcanized at 150° C. for 20, 30 and 60 minutes. The results compiled in Table 4 again demonstrate above-average tensile strengths, as well as excellent mechanical properties of the aged samples, after having been aged for 7 days at 100° C. in hot air.

Example 12

A vulcanization system, consisting of 1.5 parts by weight of N-cyclohexylbenzothiazyl sulfenamide, 1 part by weight of sulfur and 4 parts by weight of "Thiokol" LP 3 is admixed with 164 parts by weight of a basic polybutadiene mixture having the composition set forth in Example 1, and the mixture is vulcanized at 150° C. for 20, 30 and 60 minutes. The resulting vulcanizates also exhibit above-average tensile strength values, as well as good aging properties (see Table 4).

Examples 10–12 show the advantageous effect of the dithiol "Thiokol" LP 3 employed in accordance with this invention.

Example 13

In this example, the advantageous use of the dithiol "Thiokol" LP 3, employed with an amine-disulfide accelerator combination, is demonstrated. Again, excellent results are obtained. A vulcanization system consisting of 2.1 parts by weight of "Thiokol" LP 3, 0.2 part by weight of sulfur, 2.7 part by weight of diphenylguanidine and 2.1 parts by weight of dibenzothiazolyl disulfide is admixed to 164 parts by weight of the basic polybutadiene mixture described in Example 1. Samples of the thus-produced mixture is vulcanized at 150° C. for 30, 60 and 120 minutes, respectively. The properties of the resultant vulcanizates set forth in Table 4 shows excellent tensile strength values of the non-aged test bodies, as well as excellent mechanical properties of the aged samples, particularly with respect to the tensile strength, elongation at rupture, elasticity and a relatively small increase in modulus.

Table 1.—VULCANIZATION OF A FILLED POLYBUTADIENE MIXTURE AT 150° C. TESTING BEFORE AND AFTER AGING

| | Vulcanization system | | | | Vulcanizate | | | | | | | | | | | |
|---|---|---|---|---|---|---|---|---|---|---|---|---|---|---|---|---|
| | Parts by weight | | | | Before aging | | | | | | After Geer Oven aging, 7 days, 100° C. | | | | | |
| | | | | | | | | | E. | | | | | | El. | |
| Example | Dodecane-dithiol | CBS | S | Vulc. time (min.) | Ten. | Elong. | $M_{300}$ | SH | 22° | 75° | Ten. (percent) | Elong. (percent) | $M_{300}$ | SH | 22° | 75° |
| 1a | 2.9 | 3 | 0.4 | 30 | 170 | 390 | 124 | 62 | 54 | 57 | 158 (93) | 330 (85) | 147 | 66 | 58 | 63 |
| 1b | 2.9 | 3 | 0.4 | 60 | 166 | 378 | 122 | 62 | 54 | 56 | 162 (98) | 359 (95) | 141 | 66 | 56 | 59 |
| 1c | | 3 | 0.4 | 30 | 142 | 381 | 107 | 61 | 52 | 55 | 93 (65) | 200 (53) | | 66 | 56 | 60 |
| 1d | | 3 | 0.4 | 60 | 145 | 399 | 104 | 61 | 52 | 56 | 116 (80) | 258 (65) | | 66 | 54 | 58 |
| 1e | 2.9 | 6.6 | | 30 | 19 | 720 | 6 | 30 | 32 | 23 | 109 (574) | 510 (71) | 56 | 50 | 41 | 38 |
| 1f | 2.9 | 6.6 | | 60 | 56 | 678 | 16 | 40 | 34 | 27 | 116 (208) | 555 (82) | 53 | 50 | 42 | 40 |
| 2 | 4.3 | 3 | 0.4 | 10 | 165 | 429 | 111 | 61 | 52 | 57 | 143 (87) | 279 (65) | | 72 | 58 | 62 |
| | 4.3 | 3 | 0.4 | 20 | 151 | 384 | 113 | 61 | 52 | 57 | 139 (92) | 280 (73) | | 71 | 57 | 60 |
| 3 | 0.7 | 3 | 0.4 | 30 | 167 | 408 | 110 | 61 | 52 | 55 | 108 (65) | 231 (57) | | 68 | 56 | 60 |
| | 0.7 | 3 | 0.4 | 60 | 159 | 409 | 110 | 61 | 52 | 55 | 110 (69) | 235 (57) | | 66 | 56 | 59 |
| 4 | 2.2 | 3 | 0.3 | 30 | 165 | 459 | 98 | 60 | 50 | 50 | 135 (82) | 306 (67) | 137 | 66 | 54 | 57 |
| | 2.2 | 3 | 0.3 | 60 | 151 | 431 | 99 | 60 | 50 | 50 | 137 (91) | 314 (73) | 135 | 64 | 52 | 55 |
| 5 | 2.4 | 2 | 0.5 | 30 | 162 | 365 | 131 | 61 | 54 | 57 | 150 (93) | 278 (76) | | 66 | 58 | 61 |
| | 2.4 | 2 | 0.5 | 60 | 140 | 310 | 137 | 61 | 54 | 56 | 153 (109) | 299 (96) | 159 | 66 | 56 | 58 |

TABLE 2.—VULCANIZATION OF A FILLED POLYBUTADIENE MIXTURE AT 180° C. AND 200° C.

| | Vulcanization system, parts by weight | | | | | | | | | | El. | |
|---|---|---|---|---|---|---|---|---|---|---|---|---|
| Example | Dodecane-dithiol | CBS | S | Temperature (deg.) | Vulc. time (min.) | Ten. | Elong. | $M_{300}$ | SH | 22° | 75° |
| 6 | 2.2 | 3 | 0.4 | 180 | 3 | 159 | 475 | 90 | 60 | 50 | 46 |
| | | | | | 5 | 143 | 411 | 96 | 62 | 52 | 56 |
| | | | | | 10 | 146 | 410 | 97 | 62 | 52 | 56 |
| 7 | 2.2 | 3 | 0.4 | 200 | 3 | 147 | 454 | 88 | 63 | 51 | 56 |
| | | | | | 5 | 130 | 389 | 91 | 63 | 51 | 54 |
| | | | | | 10 | 151 | 424 | 94 | 63 | 51 | 54 |

TABLE 3.—VULCANIZATION OF A FILLED POLYISOPRENE MIXTURE AT 150° C. TESTING BEFORE AND AFTER AGING

| | Vulcanization system | | | | Vulcanizate | | | | | | | | | | | | | |
|---|---|---|---|---|---|---|---|---|---|---|---|---|---|---|---|---|---|---|
| | Parts by weight | | | | Before aging | | | | | | El. | | After Geer Oven aging, 7 days, 100° C. | | | | | El. |
| Ex. | Dodecane-dithiol | CBS | S | Vulc. time (min.) | Ten. | Elong. | $M_{300}$ | Tear | SH | 22° | 75° | Ten. (percent) | Elong. (percent) | $M_{300}$ | Tear | SH | 22° | 75° |
| 8a | 2.2 | 3 | 0.4 | 20 | 236 | 581 | 83 | 32 | 56 | 42 | 56 | 187 (79) | 450 (77) | 105 | 18 | 60 | 41 | 51 |
| 8b | 2.2 | 3 | 0.4 | 30 | 236 | 569 | 87 | 33 | 58 | 42 | 56 | 193 (82) | 468 (82) | 100 | 18 | 60 | 40 | 51 |
| 8c | 2.2 | 3 | 0.4 | 60 | 217 | 521 | 93 | 34 | 60 | 42 | 57 | 175 (81) | 444 (85) | 96 | 20 | 59 | 40 | 50 |
| 8d | | 3 | 0.4 | 20 | 240 | 568 | 92 | 35 | 56 | 40 | 55 | 179 (75) | 430 (76) | 108 | 18 | 60 | 38 | 48 |
| 8e | | 3 | 0.4 | 30 | 241 | 558 | 96 | 30 | 58 | 40 | 55 | 168 (70) | 425 (76) | 99 | 18 | 60 | 38 | 48 |
| 8f | | 3 | 0.4 | 60 | 234 | 540 | 94 | 27 | 58 | 40 | 55 | 160 (68) | 454 (84) | 91 | 16 | 59 | 37 | 46 |
| 9 | 2.9 | 3 | 0.5 | 20 | 240 | 606 | 80 | 37 | 56 | 42 | 55 | 179 (75) | 430 (71) | 106 | 19 | 60 | 41 | 51 |
| | 2.9 | 3 | 0.5 | 30 | 232 | 573 | 81 | 38 | 58 | 42 | 55 | 178 (77) | 443 (77) | 100 | 20 | 60 | 41 | 51 |
| | 2.9 | 3 | 0.5 | 60 | 246 | 572 | 86 | 36 | 58 | 42 | 56 | 172 (70) | 451 (79) | 95 | 19 | 59 | 40 | 50 |

TABLE 4.—VULCANIZATION OF A FILLED POLYBUTADIENE MIXTURE AT 150° C. TESTING BEFORE AND AFTER AGING

| Example | Vulcanization system Parts by weight | | | Vulc. time (min.) | Vulcanizate Before aging | | | | | | Vulcanizate After Geer Oven aging, 7 days, 100° C. | | | | | |
|---|---|---|---|---|---|---|---|---|---|---|---|---|---|---|---|---|
| | "Thiokol" LP3 | CBS | S | | Ten. | Elong. | M300 | SH | El. 22° | El. 75° | Ten. (percent) | Elong. (percent) | M300 | SH | El. 22° | El. 75° |
| 10 | 4.1 | 3 | 0.4 | 20 | 164 | 448 | 102 | 61 | 52 | 58 | 135 (82) | 278 (62) | | 70 | 58 | 64 |
| | | | | 30 | 159 | 422 | 109 | 61 | 54 | 60 | 154 (97) | 313 (74) | 147 | 70 | 58 | 64 |
| | | | | 60 | 135 | 359 | 112 | 62 | 54 | 60 | 152 (113) | 323 (90) | 141 | 70 | 56 | 62 |
| 11 | 4 | 2 | 0.6 | 20 | 155 | 436 | 96 | 60 | 50 | 54 | 117 (76) | 243 (56) | | 68 | 56 | 62 |
| | | | | 30 | 164 | 457 | 98 | 60 | 51 | 55 | 130 (79) | 278 (61) | | 66 | 56 | 60 |
| | | | | 60 | 169 | 439 | 103 | 60 | 51 | 55 | 135 (80) | 302 (69) | 135 | 66 | 56 | 60 |
| 12 | 4 | 1.5 | 1.0 | 20 | 130 | 382 | 94 | 60 | 50 | 55 | 122 (94) | 270 (71) | | 66 | 56 | 61 |
| | | | | 30 | 151 | 424 | 96 | 60 | 50 | 54 | 105 (70) | 255 (60) | | 66 | 56 | 60 |
| | | | | 60 | 143 | 406 | 97 | 60 | 50 | 54 | 94 (66) | 253 (62) | | 66 | 54 | 56 |
| 13 | 2.1 | (¹) | 0.2 | 30 | 172 | 474 | 93 | 61 | 46 | 50 | 138 (80) | 341 (72) | 116 | 66 | 52 | 57 |
| | | | | 60 | 170 | 455 | 98 | 61 | 48 | 50 | 161 (95) | 422 (93) | 111 | 66 | 52 | 57 |
| | | | | 120 | 161 | 429 | 101 | 61 | 48 | 52 | 157 (98) | 422 (98) | 106 | 66 | 52 | 57 |

¹ 2.7 diphenylguanidine plus 2.1 bidenzothiazolyl disulfide.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the vulcanization of hydrocarbon homo- and copolymers of conjugated dienes, the improvement which comprises conducting the vulcanization at about 140–200° C. in the presence of a vulcanization system consisting essentially of:
   (a) 0.5–12 parts by weight of an organic dithiol selected from the group consisting of dodecane-1,12-dithiol and a compound of the formula $$H(-SCH_2-CH_2OCH_2OCH_2CH_2-S)_6H$$

(b) 1–6 parts by weight of a vulcanization accelerator selected from the group consisting of N-cyclohexylbenzothiazyl sulfenamide and a combination of diphenylguanidine and dibenzothiazolyl disulfide; and
   (c) 0.1–1.5 parts by weight of sulfur, based on 100 parts by weight of polymer.

2. A process according to claim 1 wherein the vulcanization system consists essentially of:
   (a) 1.4–6 parts by weight of the organic dithiol;
   (b) 1.5–3 parts by weight of the vulcanization accelerator; and
   (c) 0.2–1 parts by weight of sulfur,
based on 100 parts by weight of polymer.

3. A process according to claim 1 wherein the dithiol is dodecane-1,12-dithiol.

4. A process according to claim 3 wherein the accelerator is N-cyclohexylbenzothiazyl sulfenamide.

5. A process according to claim 3 wherein a combination of diphenylguanidine and dibenzothiazolyl disulfide is employed as the accelerator.

6. A process according to claim 1 wherein the dithiol has the formula $$H(-SCH_2-CH_2OCH_2OCH_2CH_2-S)_6H$$

7. A process according to claim 6 wherein the accelerator is N-cyclohexylbenzothiazyl sulfenamide.

8. A process according to claim 6 wherein a combination of diphenylguanidine and dibenzothiazolyl disulfide is employed as the accelerator.

References Cited
UNITED STATES PATENTS

| 2,466,963 | 4/1949 | Patrick | 260—79.1 |
| 3,041,304 | 6/1962 | Gardner | 260—41.5 |
| 3,236,822 | 2/1966 | Sonnabend | 260—79.5 B |
| 3,240,844 | 3/1966 | Gruver | 260—894 |
| 3,274,142 | 9/1966 | Warner | 260—30.2 |
| 3,468,855 | 9/1969 | Hunter | 260—79.3 R |
| 3,520,854 | 7/1970 | Warner | 260—79 |

JOSEPH L. SCHOFER, Primary Examiner

C. A. HENDERSON, JR., Assistant Examiner

U.S. Cl. X.R.

260—783, 785, 797